United States Patent [19]

Golovko et al.

[11] 3,996,028

[45] Dec. 7, 1976

[54] PROCESS FOR PURIFICATION OF ARGON FROM OXYGEN

[76] Inventors: Georgy Anatolievich Golovko, Pushkin, bulvar A. Tolstogo, 16, kv. 29; Evgeny Alexandrovich Kharitonov, ulitsa Petra Lavrova, 21, kv. 5; Jury Yakovlevich Ignatov, ulitsa Kolomenskaya 33/40, kv. 59, all of Leningrad, U.S.S.R.

[22] Filed: Dec. 12, 1974

[21] Appl. No.: 532,042

[30] Foreign Application Priority Data

Apr. 20, 1974   U.S.S.R. .................. 2015805

[52] U.S. Cl. ............................... 55/58; 55/66
[51] Int. Cl.² ............................... B01D 53/04
[58] Field of Search .............. 55/58, 66, 62, 75

[56] References Cited
UNITED STATES PATENTS

| | | | |
|---|---|---|---|
| 2,793,507 | 5/1957 | Hnilicka ............................... | 55/58 |
| 2,810,454 | 10/1957 | Jones et al. ............................... | 55/66 |
| 2,893,512 | 7/1959 | Armond ............................... | 55/66 X |
| 2,944,627 | 7/1960 | Skarstrom ............................... | 55/58 X |
| 3,023,841 | 3/1962 | Milton et al. ............................... | 55/66 |
| 3,037,338 | 6/1962 | Thomas ............................... | 55/58 |
| 3,140,931 | 7/1964 | McRobbie ............................... | 55/58 X |
| 3,237,377 | 3/1966 | Skarstrom ............................... | 55/58 X |
| 3,279,153 | 10/1966 | Basmadjian et al. ............................... | 55/58 |
| 3,313,091 | 4/1967 | Berlin ............................... | 55/58 |
| 3,316,691 | 5/1967 | Sesny et al. ............................... | 55/66 |

Primary Examiner—Theodore A. Granger
Attorney, Agent, or Firm—Steinberg & Blake

[57] ABSTRACT

A process for purification of argon from oxygen comprises the step of absorption of oxygen by passing argon through synthetic zeolites of the A type with a diameter of the entry voids from 2.8 to 4.2A. Oxygen is adsorbed under a pressure of argon of 21.38–427 p.s.i.a. Then oxygen is desorbed from zeolites by reducing the pressure from 21.38–427 p.s.i.a. to atmospheric pressure with subsequent vacuum treatment of the zeolites at a pressure of $1-10^{-2}$ mm Hg. The steps of adsorption, desorption and vacuum treatment are carried out under thermostatic treatment of zeolites with a refrigerant so that a temperature of zeolites at the adsorption stage is maintained at $-186°$ C to $-133°$ C.

16 Claims, No Drawings

PROCESS FOR PURIFICATION OF ARGON FROM OXYGEN

The present invention relates to processes for purification of inert gases, and more specifically with a process for purification of argon from oxygen.

This process may be used in the cryogenic air separation technique for obtaining purified argon.

Argon is produced from air and purging gases from synthesis of ammonia by processing under cryogenic methods to obtain argon, oxygen, nitrogen, ammonia and other products. It should be noted that the use of the cryogenic treatment only (e.g. freezing-out, dephlegmation, refining) does not provide for obtaining purified argon directly at the outlet of air-separation and other apparatus. The reason for this is a physical affinity of the basic components of air, especially of argon and oxygen, as well as their relative solubility.

Thus, first a semiproduct is obtained, which is referred to as green argon, containing oxygen, nitrogen and other impurities, including hydrocarbons, when argon is produced from purging gases from the synthesis of ammonia.

The most complicated operation is the removal of oxygen which is bound to hydrogen or oxygen-active metals, such as copper, barium, alkaline-earth and other metals in conducting modern purification processes. The disadvantages of the chemical methods of purification of argon, including the method of catalytic hydration using hydrogen which is referred to as the DEOXO method consist in complicated and explosion hazardous production technique, impossibility of obtaining dry purified argon containing less than $5.10^{-6}$ vol.parts of oxygen free of hydrogen traces.

Therefore, the most advanced technique involves the employment of the physical (adsorption) process for purification of argon from oxygen based on selective adsorption of oxygen with synthetic zeolites at predetermined low temperatures.

It is known to purify argon from oxygen by adsorbing oxygen when passing argon through synthetic zeolite NaA(4A) with the diameter of the entry obids of 4.2A which is thermostatically treated with a refrigerant at a temperature of about $-178°C$.

The refrigerant comprises liquefied oxygen boiling at 21.38–19.9 p.s.i.a. $-181°C$ to $-18°C$ in coilers extending in the layer of zeolite.

By this method argon was purified from oxygen on zeolites in the conditions ensuring the gaseous state of all components. Therefore, the working pressure of argon being purified in such adsorption process could not exceed 19.2 p.s.i.a.

Residual content of oxygen in purified argon was less than $1.1.10^{-5}$ vol. parts at $-178°C$ 19.2 p.s.i.a. and initial content of oxygen in argon of from 0.02 to 0.05 vol. parts.

It should be noted that argon was not contaminated with reactants and left the adsorber in substantially dry state.

Oxygen was absorbed with zeolite selectively, and the value of the full adsorption capacity of zeolite NaA may attain 20% by mass.

The time of contact of gas with zeolite at $-178°C$ was at least 30 s.

Before the break through, that is before the appearance of oxygen in argon at the outlet of an absorber in a concentration exceeding $1.10^{-5}$ vol. parts, the oxygen adsorption capacity of zeolites NaA decreased by about 2 times.

After the adsorption, that is after the break through, the flow of argon being purified was fed into the second adsorber which was preliminarily prepared (cooled), and the stage of desorption of adsorbed oxygen began therein.

At that stage the refrigerant was removed from the coilers, and heated gaseous nitrogen was passed therethrough. In addition, hot nitrogen was blown through the working space of the adsorber, that is through the zeolite layer. The heating of zeolite was completed at $+97°C$. Then nigrogen was expelled from the working space with helium, since the presence of more thant $1.10^{-3}$ vol. parts of nitrogen in argon during the cooling of zeolite would contaminate it for oxygen, that is the entry voids of zeolite would be blocked.

After the expulsion of nitrogen with helium, liquid oxygen was again fed into the adsorber coilers to cool down the zeolite at the working temperature. Then the zeolite NaA was vacuum treated to a residual pressure of about 1 mm Hg, whereafter argon was fed into the adsorber, and the cycle was repeated.

The plant should consist of three adsorbers of which one is under the operating conditions (adsorption), in the second one oxygen is desorbed by heating, and the third adsorber is cooled after the desorption stage. It should be noted that the adsorption stage, that is the working stage should continue for a time equal or longer than the total time of the other stages (desorption and cooling).

Inspite of the advantage of the adsorption method as compared with the chemical binding of oxygen, the known process for purification of argon from oxygen on zeolite of the NaA type has a number of important disadvantages.

The use of liquid oxygen boiling under a pressure of 17.1–19.8 p.s.i.a. as refrigerant does not permit the application of higher argon pressure during the adsorption purification due to eventual condensation. A great volumetric discharge rate of argon results in a considerable increase in the diameter or height of adsorbers since the time of contact of gas with zeolite at $-180°C$ to $-178°C$ should be longer than 30 s. It is for this reason that the practical implementation of the process for purification of argon by the prior art method requires the construction of adsorbers of a height of 6 meters. Furthermore, the adsorption capacity of zeolite is incompletely utilized.

For these reasons, the desorption process by the known method represents a complicated and power consuming operation which requires a long time and employment of a number of precleaned gases, such as nitrogen, helium and argon. In addition, an elevated consumption of a refrigerant for cooling zeolite at the working temperature, that is below $-133°$ C is required, as well as an insulation from the positive temperature.

The use of pure oxygen for cooling adsorbers accompanied by evaporation of a considerable part of the refrigerant fed may result in an increased concentration of explosion hazardous impurities, such as acetylene.

The entire purification process occurs substantially at a constant temperature which may result, in the conditions of comparatively low flow rates of argon being purified under the operating conditions, and especially at the initial state (3–5 minutes), in the formation of bimers of the $Ar_2$ and $O_4$ type, blocking of the entry voids of zeolite and interruption of the purification process.

By the prior art method, the adsorbent comprised only a single type of zeolite NaA (4A) having a diameter of the entry voids of about 4.2.A. Taking into account the size of oxygen molecule (2.8 A) and argon atom (3.84 A), the temperature zone in which oxygen is selectively adsorbed from a mixture with argon is limited and lies within the range from $-180°$ C to $-165°$C. This requires rather strict production conditions since an increase in temperature above $-165°$ C results in adsorption of argon and interruption of the purification process.

All of the above prior processes and similar processes have one common disadvantage: There is absolutely no provision for the prevention of a "coat" made up of molecules (or atoms) which combine to form bimers like $Ar_2$ and $O_4$ or even more complex compounds due to the forces of intermolecular cohesion. Such compounds are formed only at low temperatures (below the critical temperature) and are unstable but still capable of slowing down and even terminating the process of impurity removal from the gas in question.

Furthermore, it is known that the inlets of zeolites (or other molecular sieves) become blocked by molecules having a larger effective diameter than that of the absorbent inlet.

The latter phenomenon of molecular sieve "contamination" is widely known. However, no one has offered a satisfactory explanation of the phenomenon or suggested an effective method of controlling it.

Laboratory and pilot-scale studies of this latter phenomenon have led to a method of preventing the foregoing coat which simultaneously provides for a substantial increase in the dynamic capacity of the adsorbents in terms of the components being adsorbed at a less than critical temperature, e.g. $-123°$C. The method suggested successfully uses the sharp temperature variations of the adsorbent, in excess of 5° per minute, which effectively prevents the passage of unpurified gas through the adsorber, while at the same time increasing the dynamic capacity of the adsorbent by 5 to 10% and markedly reducing the level of impurities, e.g. oxygen in argon and nitrogen in helium.

It is an object of the invention to simplify the process for purification of argon from oxygen and to improve its efficiency.

With this and other objects in view, the invention consists in the provision of a process for purification of argon from oxygen comprising the steps of adsorption of oxygen by passing argon under a pressure of 21.38–427 p.s.i.a. through synthetic zeolites of the A type having a diameter of the entry voids from 2.8 to 4.2 A, desorption of oxygen from the zeolites by reducing the pressure from 21.38–427 p.s.i.a to atmospheric, and vacuum treatment of the zeolites at a pressure of $1-10^{-2}$ mm Hg, the steps of adsorption, desorption and vacuum treatment being carried out under a thermostatic treatment of the zeolites with a refrigerant so as to maintain a temperature of zeolites at the adsorption stage from $-186°$ C to $-133°$C.

The refrigerant preferably comprises liquefied oxygen, liquefied nitrogen, mixtures thereof or liquefied argon.

The desorption of oxygen is preferably conducted with concurrent increase of the refrigerant pressure by 7.12–498 p.s.i.a.

In order to recover the adsorption properties of the zeolites after the desorption of oxygen and prior to the vacuum treatment of synthetic zeolites of the A-type, the thermostastic treatment of these zeolites with refrigerant is preferably interrupted, and the zeolites are thermostatically treated with a gaseous heating medium to increase the temperature of the zeolites up to $-23°$C to $+27°$ C, whereafter the zeolites are vacuum treated at this temperature, and then the thermostatic treatment with the refrigerant is renewed.

The gaseous heating medium may comprise air or nitrogen.

In order to eliminate the formation of bimers of the $Ar_2$ and $O_4$ type, when the temperature of synthetic zeolites is from $-186°$C to $-180°$ C, a pulsewise increase in the temperature of these zeolites during the adsorption of oxygen is preferably provided at a rate of $5°-10°$ temperature change per minute during the first 3–5 minutes of the adsorption process, whereafter the temperature of zeolites is maintained at the level thus attained.

The pulsewise increase in the temperature of zeolites may be provided either by a pulsewise increase in the refrigerant pressure or by a pulsewise increase in the argon feeding rate.

When the temperature of synthetic zeolites is from $-170°$ C to $-169°$C, the temperature of zeolites is reduced pulsewise during the oxygen adsorption for the same purpose at a rate of 5–10 degrees per minute for the first 3–5 minutes of the adsorption process, whereafter the temperature of zeolites is maintained at the level thus attained.

This pulsewise increase in temperature may be provided by a pulsewise reduction of the refrigerant pressure.

When the temperature of zeolites is from $-179°$C to $-171°$ C, a pulsewise temperature increase or decrease of zeolites may be provided at a rate of $5°-10°$ per minute for the first 3–5 minutes during the adsorption of oxygen, whereafter the temperature is maintained at the level thus attained.

An increase or decrease of temperature is preferably provided by the above-described methods.

When nitrogen is also contained in argon, in addition to oxygen, nitrogen is preferably removed from argon by refining prior to the separation of oxygen.

The process for purification of argon from oxygen according to the invention has the following advantages as compared to the prior art.

Differently from the prior art, the use of refrigerant comprising liquefied nitrogen, liquefied oxygen, mixtures thereof or liquefied argon boiling under a gauge pressure provides for any desired predetermined temperature of the purification process and offers an opportunity of changing this temperature by modifying the refrigerant pressure.

In practice, the most convenient is the employment of a mixture of oxygen and nitrogen (liquefied air) which considerably diminsh the explosion hazard of the process, as liquiefied nitrogen or argon.

The utilization of preselected temperature zone of the selective adsorption of oxygen from the mixture thereof with argon enables a simplification of the production method of the process conducted under a working pressure from 21.38 to 427 p.s.i.a. It will be apparent that a pressure increase results in a more complete utilization of the adsorption capacity of zeolites which increases by 1.2–1.5 times.

A reduction of the physical volume of argon being purified results in a decreased volumetric discharge rate of the flow, longer time of contact of the gas with absorbent and a reduction of adsorber height by 2–3 times. Thus, the height of the adsorbent layer may be as low as 1.5–2.5 m.

A concurrent application of an increased working pressure during argon purification and dynamically active adsorbents allows for the process of desorption of adsorbed oxygen to be conducted mainly by reducing the pressure from 21.38–427 p.s.i.a. to atmospheric.

It should be noted that, in order to minimize the losses of the product, the gas discharged from the adsorber may be utilized, and in particular, it may be directed into an adjacent adsorber or into a plant for purification of argon from nitrogen. The utilization of the entire temperature range of selective adsorption of oxygen from the mixture thereof with argon with zeolites of the A type, especially with cation-substituted forms of the zeolite NaA, allows for the method of pulsewise temperature increase method to be used by changing the pressure of refrigerant or flow rate of green argon. Pulsewise temperature changes eliminate the formation of bimers of the $Ar_2$ and $O_4$ type which would otherwise block the entry voids of zeolite and interrupt the process of purification of argon from oxygen.

Pulsewise temperature changes also result in changes in the rhythm of oscillations of atoms in the lattice of zeolite which contributes to an improvement of the adsorption capacity thereof as regards the component being adsorbed.

An increase in the refrigerant pressure during the desorption by 7.12–498 p.s.i.a. provides for a required heating of zeolite including the compensation for the temperature reduction which is due to the gas desorption. The removal of the residual gases and additional desorption of oxygen are conducted by reducing the pressure in the working space to $1-10^{-2}$ mm Hg.

In order to completely restore the adsorption properties of zeolite at regular intervals, it is heated at −23° C to 27° C, that is below the ambient temperature. Thus, the desorption is conducted without any heating, in the conditions substantially close to the isothermal ones, whereby the refrigerant consumption and desorption time are materially reduced. The purification process is thus simplified, no pure purging gases (nitrogen, helium) are required, the operational characteristics of the plant are improved and the service life of adsorbent, adsorbers, communication lines, and especially of fittings is prolonged.

In processing substantially dry argon supplied from an air-separation apparatus or from a plant for purification of argon from nitrogen by refining, the initial operating mode of recovery of zeolites may be repeated every score and even every hundred of cycles.

The process of purification of argon from oxygen is preferably carried out as follows.

Argon containing 0.01–0.03 vol. parts of oxygen is fed into a precooled adsorber charged with synthetic zeolites of the A type having a diameter of the entry voids from 2.8 to 4.2 A.

The absorber may comprise a cylindrical apparatus having coilers for feeding a refrigerant or heating medium mounted therein, or an annular or tube bundle type apparatus.

The space of the adsorber containing zeolite is referred to as working space. In any case, the height of the zeolite layer should not exceed 80 mm, and is preferably from 40 to 60 mm.

From the structural and practical considerations, tube bundle adsorbers are preferably used in which zeolites are placed in the tubes, and a refrigerant or heating medium is fed into the intertube space.

Prior to the purification of argon from oxygen, synthetic zeolites are subjected to the primary regeneration, that is they are heated at 400° C at a rate not exceeding 1 degree per minute and allowed to stay at this temperature for 3–5 hours. A heating gas (air or nitrogen) may be fed either into the intertube space, or into the tubes, or into the both. During primary regeneration, practically all the moisture should be removed from the zeolite, and in any case, the residual moisture content should not exceed 2% by mass. The presence of a greater amount of moisture may substantially impair the quality of purification of argon from oxygen due to the blocking of the entry voids of zeolite with water molecules.

After the regeneration of zeolite, it is cooled at 40°–50° C by purging the adsorber with non-heated nitrogen or air, and subsequently a further cooling is obtained after evacuation of gases to a pressure of about $1.10^{-2}$ mm Hg by feeding a liquid refrigerant into the intertube space.

The refrigerant for thermostatic treatments of zeolites comprises liquefied oxygen, liquefied nitrogen, mixtures thereof ($0.21 O_2 + 0.79 N_2$; $0.40_2 + 0.6 N_2$ and the like), or liquefied argon. A refrigerant pressure is maintained within the range of 14.22 to 569 p.s.i.a. so as to maintain the temperature of zeolites at the oxygen adsorption stage at the level from −186° to −133° C.

The adsorption conditions depend on the type of zeolite used, working pressure and the type of refrigerant, its quantity and characteristics.

Thus, for zeolites of the NaA type, the adsorption temperature is preferably from −180° to −168° C: for potassium form of zeolite NaA from −186° to −168° C, for silver form of zeolite NaA - from −186° to −158° C, for lithium form of zeolite NaA - from −186° to −133° C.

In conformity with the above-specified temperature values, the pressure of argon being purified in the tube space and the pressure of refrigerant in the intertube space are maintained.

At the initial period of the adsorption, during the first 3–5 minutes, in order to eliminate the formation of bimers of the $Ar_2$ and $O_4$ type, pulsewise temperature changes are provided in the tube space at a rate from 5° to 10° per minute either by changing the pressure of refrigerant in a pulsewise manner in the intertube space or by changing the feeding rate of argon in a pulsewise manner. Then the temperature in the tube space (zeolite and gaseous phase) is maintained at the attained substantially constant level.

During the passage of argon through the layer of zeolite, the latter selectively and almost completely adsorbes oxygen.

The adsorbents for purification of argon from oxygen comprise pelletized (2–2.5 mm diameter) synthetic zeolites of the A type with or without binders: NaA and cation-substituted forms thereof, such as potassium form KNaA, silver form AgNaA, lithium form LiNaA. The substitution of Na cation for K (more than 60%), Ag (more than 20%), Li (more than 10%) results in a decreased diameter of the entry voids from 4–4.2 to 2.8–3.2A so that the temperature range of selective adsorption of oxygen from the mixture thereof with argon is materially enlarged.

The working temperature of the argon purification may be also substantially increased for the same reason so that an appropriate selection of refrigerant and parameters thereof may allow a considerable increase in the working pressure of the purification process. While the working pressure for zeolite NaA may be increased up to 83.3 p.s.i.a., this value is 131.5 p.s.i.a. for KNaA zeolite, 206 p.s.i.a. for AgNaA zeolite and 355.5–427 p.s.i.a. for LiNaA zeolite.

With the above-mentioned parameters and at a temperature of the zeolite layer of −186° to −180° C, during the initial period of the purification (first 3–5 minutes) a pulsewise temperature increase is provided at a rate of 5°–10° per minute in the tube space of the adsorber by respectively increasing the pressure of refrigerant in the intertube space in a pulsewise manner by increasing the feeding rate of green argon in a pulsewise manner. The temperature is increased up to −178° to −168° C and is maintained at this level.

At a temperature of the zeolite layer of −179° to −168° C the above-described pulsewise temperature change may be effected either with an increase as described above, or with a decrease by a pulsewise reduction of the refrigerant pressure in the intertube space of the adsorber.

At a temperature equal to or above −170° C, the pulsewise change in temperature may be effected only with a decrease by pulsewise reduction of the refrigerant pressure.

Purified dry argon is discharged from the adsorber in the gaseous state and pumped into bottles. After the zeolite is saturated with oxygen (that is after the lapse of protective time), argon being purified is fed into an adjacent adsorber, and the desorption of adsorbed oxygen is effected. For that purpose the pressure of argon is reduced from the working pressure to atmospheric with concurrent increase in the refrigerant pressure by 7.12—498 p.s.i.a.

This pressure increase of refrigerant is effected to compensate for desorption heat and temperature increase of zeolite.

0.5–3 hours after the pressure reduction of argon, the gases are evacuated from the tube space of the adsorber to a residual pressure of about $1.10^{-2}$ mm Hg. Subsequently the refrigerant pressure is reduced, and the temperature of zeolite is increased to −186° to −133° C depending on the type of zeolite used and operating conditions of purification of argon, whereafter the adsorber may be again switched over to the purification operation.

Where it is necessary to restore the initial purification characteristics after the completion of the desorption process, the refrigerant is replaced with a heating medium which may comprise air or nitrogen at +27° to +77° C, and the temperature of zeolite is increased up to −23° to +27° C.

Where the refrigerant comprises liquefied oxygen or a mixture of liquefied nitrogen and oxygen with a volumetric content of the latter exceeding 0.2 vol. parts, the heating media (nitrogen or air) should be free of traces of organic oils.

Then the working space of the adsorber is evacuated to a pressure of $1.10^{-1} = 1.10^{-2}$ mm Hg, and zeolite is cooled at working temperature (−186° to −133° C).

Then the cycle is repeated.

Where argon contains 0.01–0.03 vol. parts of oxygen and 0.02–0.1 vol. parts of nitrogen, the nitrogen is first moved by refining. The residual content of nitrogen should not exceed 0.001 vol. parts.

The invention will be better understood from the following specific examples illustrating the process for purification of argon from oxygen.

EXAMPLE 1

Argon containing 0.001 vol. parts of nitrogen after refining and 0.03 vol. parts of oxygen was fed under a pressure of 21.38 p.s.i.a. into the tube space of an adsorber filled with synthetic zeolite NaA with a binder (diameter of the entry voids of zeolite 4 A). Spherical pellets of 2.5 mm diameter were used. The inside diameter of the adsorber was 45 mm, the height — 1500 mm.

A refrigerant comprising liquefied nitrogen boiling under a pressure of 69.6 p.s.i.a. was fed into the intertube space of the adsorber.

The temperature of the zeolite was −180° C.

During the first five minutes of the adsorption process, the temperature of zeolite was increased in a pulsewise manner at a rate of 5° per minute by increasing the pressure of liquefied nitrogen in a pulsewise manner up to 142.3 p.s.i.a.

Subsequently, the adsorption temperature was maintained at the level thus obtained.

After the adsorption, the residual content of oxygen in argon was below $3.10^{-6}$ vol. parts with the oxygen adsorption capacity of zeolite NaA equal to 10% by mass of the adsorbent before the break through.

The desorption of the adsorbed oxygen from zeolites was effected by reducing the pressure from 21.38 p.s.i.a. to atmospheric. Then a heating medium — air at +27° C — was fed into the intertube space of the adsorber to replace the refrigerant.

Thus the temperature of the zeolite was raised up to −23° C.

The zeolites were vacuum treated to a residual pressure of $1.10^{-1}$ mm Hg, and then the supply of the refrigerant was renewed.

After the desorption and vacuum treatment in conformity with the above-described operating conditions, the adsorption capacity of zeolite and residual content of oxygen in the purified argon remained at the above-mentioned level during 30 operational cycles.

EXAMPLE 2

Argon was purified from oxygen as described in Example 1.

The difference consisted in that the pressure of argon being purified during the adsorption was 68.3 p.s.i.a., and the pulsewise temperature increase of zeolite was effected at a rate of 5° per minute for the first 50 seconds of the adsorption process, whereafter the temperature was maintained at the level thus attained. The pulsewise temperature increase was effected by increasing the pressure of refrigerant in the intertube space in the pulsewise manner up to 156.4 p.s.i.a. The time of contact of the gas with the adsorbent was increased by almost 3 times.

After the adsorption the content of oxygen in the purified argon did not exceed $2.5.10^{-6}$ vol. parts, and the value of oxygen adsorption capacity of zeolite was of 1% by mass of the adsorbent.

The desorption of oxygen from zeolites was effected by reducing the pressure from 68.3 p.s.i.a. to atmospheric, the refrigerant pressure being increased up to 284 p.s.i.a.

One hour after the beginning of the desorption, the gases were evacuated from the intertube space for 2–3 hours to a residual pressure below $1.10^{-2}$ mm Hg.

Subsequently, the working pressure of refrigerant was reduced to 14.2 p.s.i.a., and the cycle was repeated.

It should be noted that in some experiments the content of oxygen the purified argon increased by one order of magnitude, and the adsorption capacity of zeolite decreased by 30%.

EXAMPLE 3

Argon was purified from oxygen with the parameters shown in Example 1, with the only difference that the refrigerant pressure in the intertube space was not increased during the 1 low-temperature desorption of oxygen.

Residual content of oxygen in the purified argon in some experiments increased by 1–3 orders of magnitude, and the oxygen adsorption capacity of zeolite decreased by 30–70.

EXAMPLE 4

Argon containing 0.05 vol. parts of oxygen was fed under a pressure of 78.2 p.s.i.a. into the tube space of an adsorber having the inside diameter of 50 mm.

The purification was carried out on the potassium form of zeolite NaA, having the diameter of the entry voids of 3.2A. The height of the zeolite layer was 2,000 mm, an average size of zeolite pellet shaped as truncated cone was 3×4 mm.

The time of contact of the gas with zeolite was more than 3 minutes.

The refrigerant comprised a mixture of oxygen and nitrogen (liquefied air) boiling under a pressure of 156.4 p.s.i.a. The temperature of the zeolite layer was about $-166°$ C.

At the initial stage of adsorption (during the first two minutes) a pulsewise temperature increase of zeolite was effected at a rate of 5°–6° per minute by increasing the feeding rate of argon by 2–3 times in a pulsewise manner. Subsequently the temperature was maintained at the level thus attained. Residual content of oxygen in the purified argon did not exceed $5.10^{-6}$ vol. parts, and the oxygen adsorption capacity of the zeolite was as high as 10½ by mass.

The low-temperature desorption during 15 cycles effected as described in Example 2, with the only difference that it was conducted with an increase in the pressure of refrigerant by 7.12 p.s.i.a., resulted in a slight increase in the residual content of oxygen in argon with a reduction of the adsorption capacity of zeolite by 1.5–2 times.

The desorption by reducing the pressure to atmospheric with subsequent increase in the zeolite temperature to +27° C by thermostatically treating it with air at +77° C and vacuum treatment of the zeolite to the residual pressure of 1.10 mm Hg resulted in complete restoration of the initial quality of purification.

EXAMPLE 5

Argon was purified from oxygen on zeolite in the silver form (the size of the entry voids of 3 A). The height of the zeolite layer was 1300 mm. Average size of the spherical pellets of zeolite was 2.2 mm.

The inside diameter of the adsorber was 45 mm.

The content of oxygen in the argon purified was 0.02 vol. parts. The pressure of argon being purified was 128 p.s.i.a. The time of contact of the gas with zeolite was more than 4 minutes.

The refrigerant comprised liquefied oxygen at 106.5 p.s.i.a. The temperature of the zeolite layer was about $-158°$ C.

At the initial stage of adsorption (during the first five minutes) a pulsewise increase of the temperature of zeolite at a rate of 8 degrees per minute was effected due to a reduction of the refrigerant pressure in the intertube space in a pulsewise manner.

Residual content of oxygen in the purified argon did not exceed $2.5.10^{-6}$ vol. parts, and the oxygen adsorption capacity of the zeolite was as high as 11% by mass.

The low-temperature desorption during 10 cycles effected as described in Example 2 resulted in a reduction of the adsorption capacity of zeolite by 10–40% with a slight increase in the content of oxygen in the purified argon of the order of 0.5.

The desorption of the adsorbed oxygen after the 11th cycle by reducing the argon pressure to atmospheric, draining of the refrigerant from the intertube space and purging thereof for 3–4 hours with nitrogen at +27° C resulted in an increase in the zeolite temperature up to $-3°$ C.

Subsequent evacuation of the working space of the adsorber to a residual gas pressure not exceeding $1.10^{-2}$ mm Hg resulted in complete restoration of the adsorption capacity of zeolite and degree of oxygen removal.

EXAMPLE 6

Argon was purified from oxygen on the lithium form of zeolite NaA with a size of the entry voids of 2.8A. The height of the zeolite layer was 1,700 mm, average size of spherical pellets of zeolite was 2.8 mm. The inside diameter of the adsorber was 51 mm.

The content of oxygen in the purified argon was 0.03 vol. parts. The pressure of argon being purified was 427 p.s.i.a. The time of contact of the gas with adsorbent did not exceed 8 minutes.

The refrigerant comprised liquefied argon boiling in the intertube space of the adsorber under a pressure of 498 p.s.i.a.

At the initial stage of adsorption (during the first two minutes) the zeolite temperature was pulsewise increased at a rate of 10° per minute due to a reduction of the refrigerant pressure in a pulsewise manner.

The content of oxygen in the purified argon did not exceed $5.10^{-6}$ vol. parts, and the oxygen adsorption capacity of zeolite was as high as 13% by mass.

The low-temperature desorption of the adsorbed oxygen effected as described in Example 2 during six cycles resulted in complete restoration of the zeolite properties.

EXAMPLE 7

Argon was purified from oxygen on zeolite NaA with a binder having a size of the entry voids of 4.2A. The height of the zeolite layer was 1,300 mm. Average size of spherical pellets of zeolite was 2.7 mm. The inside diameter of the adsorber was 55 mm.

The content of oxygen in the purified argon was 0.02 vol. parts. The pressure of argon being purified was 39.1 p.s.i.a. The time of contact of the gas with adsorbent exceeded 1.5 minutes.

The refrigerant comprised a liquefied mixture of 40% of oxygen and 60% of nitrogen boiling under a pressure of 75.5 p.s.i.a. At the initial stage of adsorption (during the first 3 minutes) a pulsewise increase in the zeolite temperature was effected at a rate of 7° per minute due to a reduction of the refrigerant pressure to 142.23 p.s.i.a. in a pulsewise manner.

The content of oxygen in the purified argon was below $4.10^{-6}$ vol-parts, and the oxygen adsorption capacity of zeolite was as high as 12% by mass.

The desorption of the adsorbed oxygen was effected by reducing argon pressure to atmospheric with subsequent feeding into the intertube space of a heating medium comprising air at +27° C. Then the vacuum treatment to $1.10^{-1}$ mm Hg was effected. The quality of purification remained unchanged during 18 cycles.

EXAMPLE 8

Argon was purified from oxygen as described in Example 6 with the only difference that at the initial stage of adsorption (during the first two minutes) the zeolite temperature was increased in a pulsewise manner at a rate of 5°–10° per minute by raising the refrigerant pressure in a pulsewise manner. The quality of purification of argon was the same as in Example 6.

What is claimed is:

1. A process for purification of argon from oxygen comprising the steps of adsorption of oxygen by passing argon under a pressure of 21.38–427 p.s.i.a. through synthetic zeolites of the A type having a diameter of the entry voids from 2.8 to 4.2 A, desorption of oxygen from the zeolites by reducing the pressure from 21.38–427 p.s.i.a. to atmospheric and vacuum treatment of the zeolites to a pressure of $1$–$10^{-2}$ mm Hg, said steps of adsorption, desorption and vacuum treatment being conducted under a thermostatic treatment of the zeolites with a refrigerant so that the temperature of zeolites at the adsorption stage is maintained at −186° to −133° C.

2. A process according to claim 1, wherein the refrigerant is selected from the group consisting of liquefied oxygen, liquefied nitrogen, mixtures thereof and liquefied argon.

3. A process according to claim 1, wherein the desorption of oxygen is conducted with concurrent increase in the refrigerant pressure by 7.12–498 p.s.i.a.

4. A process according to claim 1, wherein, after the desorption of oxygen and prior to the vacuum treatment of synthetic zeolites of the A type, the thermostatic treatment of said zeolites with the refrigerant is interrupted, and the zeolites are thermostatically treated with a gaseous heating medium to increase the temperature of said zeolites up to −23° to +27° C, whereafter the zeolites are vacuum treated at this temperature, and then the thermostatic treatment of the zeolites with the refrigerant is renewed.

5. A process according to claim 4, wherein the gaseous heating medium is selected from the group consisting of air and nitrogen.

6. A process according to claim 1, wherein, where a temperature of synthetic zeolites is from −186° to −180° C, the temperature of said zeolites is increased during the adsorption of oxygen in a pulsewise manner at a rate of 5°–10° temperature change per minute during the first 3–5 minutes of the adsorption process, whereafter the zeolite temperature is maintained at the level thus attained.

7. A process according to claim 6, wherein the pulsewise increase in the zeolite temperature is effected by increasing the refrigerant pressure in a pulsewise manner.

8. A process according to claim 6, wherein the pulsewise increase in the zeolite temperature is effected by increasing the feeding rate of argon in a pulsewise manner.

9. A process according to claim 1, wherein where a temperature of synthetic zeolites is from −170° to −133° C, the temperature of said zeolites is reduced during the adsorption of oxygen on a pulsewise manner at a rate of 5°–10° per minute during the first 3–5 minutes of the adsorption process, whereafter the zeolite temperature is maintained at the level thus attained.

10. A process according to claim 9, wherein the pulsewise reduction of the zeolite temperature is effected by reducing the refrigerant temperature in a pulsewise manner.

11. A process according to claim 1, wherein, where a temperature of synthetic zeolites is from −179° to −171° C, the temperature of said zeolites is increased during the adsorption of oxygen in a pulsewise manner at a rate of 5°–10° temperature change per minute during the first 3–5 minutes of the adsorption process, whereafter the zeolite temperature is maintained at the level thus attained.

12. A process according to claim 11, wherein the pulsewise increase in the zeolite temperature is effected by increasing the refrigerant pressure in a pulsewise manner.

13. A process according to claim 11, wherein the pulsewise increase in the zeolite temperature is effected by increasing the feeding rate of argon in a pulsewise manner.

14. A process according to claim 1, wherein, where the temperature of synthetic zeolites is from −179° to −171° C, the temperature of said zeolite is reduced during the adsorption of oxygen in a pulsewise manner at a rate of 5°–10° temperature change per minute during the first 3–5 minutes of the adsorption process, whereafter the zeolite temperature is maintained at the level thus attained.

15. A process according to claim 14, wherein the pulsewise reduction of the zeolite temperature is effected by reducing the refrigerant pressure in a pulsewise manner.

16. A process according to claim 1, wherein, where argon contains nitrogen in addition to oxygen, nitrogen is removed from the argon by refining prior to the removal of oxygen.

* * * * *